No. 686,773. Patented Nov. 19, 1901.
J. SEYMOUR.
VALVE FOR GAS METERS.
(Application filed Nov. 18, 1899. Renewed Apr. 22, 1901.)
(No Model.)

Witnesses
A. J. Colbourne.
J. H. Webster.

Inventor
John Seymour
by
Ridout & Maybee
Attys.

THE NORRIS PETERS CO., PHOTO-LITHO., WASHINGTON, D. C.

UNITED STATES PATENT OFFICE.

JOHN SEYMOUR, OF TORONTO, CANADA.

VALVE FOR GAS-METERS.

SPECIFICATION forming part of Letters Patent No. 686,773, dated November 19, 1901.

Application filed November 18, 1899. Renewed April 22, 1901. Serial No. 56,993. (No model.)

*To all whom it may concern:*

Be it known that I, JOHN SEYMOUR, manufacturer, of the city of Toronto, in the county of York, Province of Ontario, Canada, have invented certain new and useful Improvements in Valves for Gas-Meters, of which the following is a specification.

My invention relates to certain improvements in a valve for gas-meters described and claimed in United States Patent No. 637,424, granted to me on November 21, 1899.

Its object is to reduce the friction in the valve to a minimum and also to lessen the chances of the faces of the valve and its seat becoming unevenly worn; and it consists, essentially, in separating the valve into two portions, the outer portion, which covers the annular inlet-space, being made stationary, while the inner part revolves, as before, to make the necessary connections between the ports.

Figure 1:
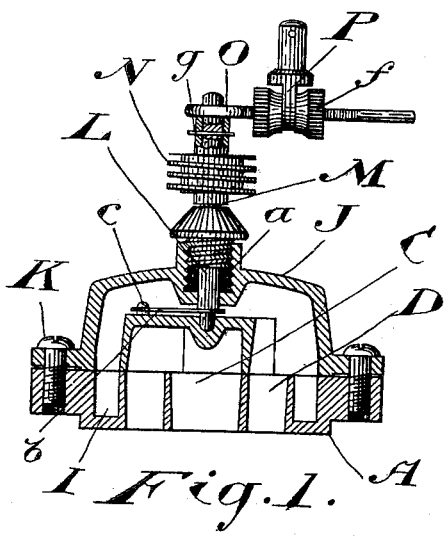
Figure 3:
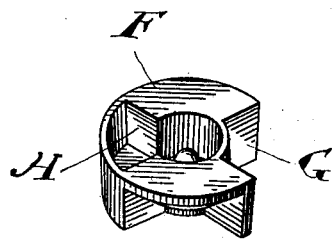
Figure 2:
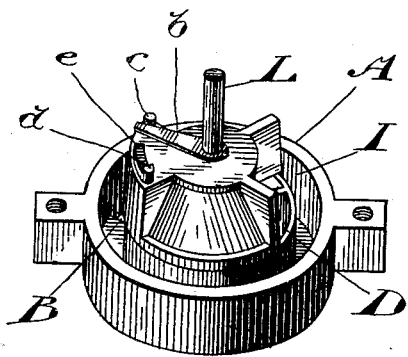
Figure 4:
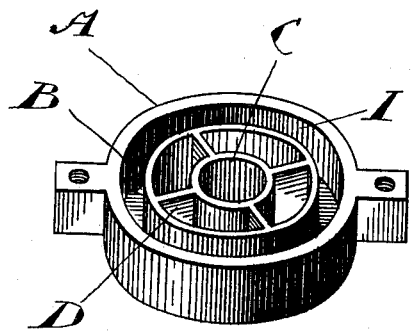

Figure 1 is a vertical section showing my improvements. Fig. 2 is a perspective view of a valve-seat and valve with the cover removed. Fig. 3 is a perspective view of the under side of the valve. Fig. 4 is a similar view of the upper side of the valve-seat.

In the drawings like letters of reference indicate corresponding parts in the figures.

A is a valve-seat, which is the same in construction as that shown in the application hereinbefore referred to.

B is the inlet-port communicating with the annular inlet-space I, C the central outlet-port, and D the intermediate ports arranged in diametrically opposite pairs.

F is the valve, which is provided with the inlet-opening G and the outlet-recess H. It differs, however, from the valve shown in the application hereinbefore referred to in that it is not provided with an outer revolving portion capable of closing the annular inlet-space I from the top space of the meter. The omitted outer portion referred to has substituted therefor the stationary cover J, properly faced and clamped down upon the face of the outer rim of the annular inlet-space I by means of the screws K, passing through suitable lugs. In the top of the cover is made an opening, through which is passed the valve-spindle L, the opening being preferably provided with the stuffing-box $a$. The lower end of this spindle is provided with an arm $b$, located when in operative position between the studs $c$ and $d$ upon the upper surface of the valve F. Located between the two studs and leading up to the stud $d$ is an inclined plane $e$. When the meter is working, the arm engages the stud $c$. If any attempt is made to work the meter backward, the arm $b$ rises up the inclined plane $e$ into contact with the stud $d$, and the working of the valve is immediately deranged. The inclined plane causes the arm $b$ to exert a downward pressure on the valve, which prevents any leakage which might occur when the working of the meter was so tampered with.

Secured about the valve-spindle L is the sleeve M, to which is secured the worm N, which will operate the indicating mechanism, as described in the previous application referred to. At the upper end of this sleeve is secured the tangent O, upon which slides the stud P, held between the clamping-nuts $f$, the tangent being suitably threaded for engagement by these nuts. Through the medium of this stud the tangent will be revolved, as described in my previous application. The sleeve N may be secured about the spindle L by any suitable means, a pin $g$ passing through holes in the sleeve of the spindle, as shown, being one of the simplest. By securing the tangent and worm to the sleeve made detachable from the spindle I am enabled to readily place the latter in position in the cover and remove it at any time, and I am also enabled to readily pack the opening through which it passes by means of the stuffing-box $a$.

From the above description it will be seen that the gas-pressure is equal below and above the valve F, so that the only friction-creating pressure of the latter on its seat is due to its weight and that of the attached parts. Further, the rubbing surfaces in contact are much reduced and, being comparatively close to the center, tend always to wear evenly.

What I claim as my invention is—

1. In a meter a valve-seat having a central outlet-port, two or more intermediate ports of equal size diametrically opposite each other and an annular groove surrounding said intermediate ports and forming an inlet, in combination with a rotary valve provided with an inlet-opening adapted to place any of said intermediate ports in communication with the inlet; an outlet-recess diametrically opposite the inlet-recess adapted to place the opposite intermediate port in communication with the outlet-port; and a cover clamped down upon the outer wall of the aforesaid annular inlet-space, substantially as and for the purpose specified.

2. In a meter a valve-seat provided with inlet and outlet ports and ports leading to the gas-spaces of the meter in combination with a rotary valve adapted to place each port leading to a gas-space alternately in communication with the inlet and outlet ports; a cover clamped to the valve-seat and with the seat inclosing a gas-space; a valve-spindle adapted to rotate the valve and passing through an opening in the cover; and a sleeve detachably secured to the upper portion of the said spindle and to which are connected the indicator-worm and the tangent, substantially as and for the purpose specified.

3. In a meter a valve-seat provided with inlet and outlet ports and ports leading to the gas-spaces of the meter in combination with a rotary valve adapted to place each port leading to a gas-space alternately in communication with the inlet and outlet ports; a cover clamped to the valve-seat and with the seat inclosing a gas-space; a stuffing-box fitted to an opening in the cover; a valve-spindle adapted to rotate the valve and passing through the said stuffing-box; and a sleeve detachably secured to the upper portion of the said spindle and to which are connected the indicator-worm and the tangent, substantially as and for the purpose specified.

4. In a meter a valve-seat provided with inlet and outlet ports and ports leading to the gas-spaces of the meter in combination with a rotary valve adapted to place each port leading to a gas-space alternately in communication with the inlet and outlet ports; two studs on the upper side of the valve; a valve-spindle suitably journaled and having its lower end set within a recess or step in the valve; an arm rigidly connected to the said spindle and adapted to engage either of the studs; and an inclined plane leading up to one of the studs, substantially as and for the purpose specified.

Toronto, November 3, 1899.

JOHN SEYMOUR.

In presence of—
J. EDW. MAYBEE,
A. J. COLBOURNE.